United States Patent
Bindig et al.

(10) Patent No.: US 12,421,958 B2
(45) Date of Patent: Sep. 23, 2025

(54) HOLDER FOR FASTENING A PUMP

(71) Applicant: BÜHLER MOTOR GMBH, Nuremberg (DE)

(72) Inventors: Andrea Bindig, Nuremberg (DE); Martin Gundermann, Nuremberg (DE); Harald Rausch, Fürth (DE); Daniel Bierl, Schnaittach (DE); Klaus Weiske, Altdorf (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 125 days.

(21) Appl. No.: 18/281,495

(22) PCT Filed: Mar. 3, 2022

(86) PCT No.: PCT/DE2022/200034
§ 371 (c)(1),
(2) Date: Sep. 11, 2023

(87) PCT Pub. No.: WO2022/188931
PCT Pub. Date: Sep. 15, 2022

(65) Prior Publication Data
US 2024/0151220 A1 May 9, 2024

(30) Foreign Application Priority Data
Mar. 12, 2021 (DE) .......................... 102021106098.2

(51) Int. Cl.
*F04B 53/00* (2006.01)
*F04B 23/04* (2006.01)
*F04B 53/22* (2006.01)

(52) U.S. Cl.
CPC ............ *F04B 53/003* (2013.01); *F04B 53/22* (2013.01); *F04B 23/04* (2013.01)

(58) Field of Classification Search
CPC ........ F04B 23/04; F04B 53/003; F04B 53/16; F04B 53/22; F16F 1/3835; F16F 1/38; F04D 29/605; F16L 55/035
(Continued)

(56) References Cited

U.S. PATENT DOCUMENTS 2,302,668 A * 11/1942 Banneyer ................ F16L 3/222
                                                          248/68.1
2,936,141 A * 5/1960 Rapata ..................... F16F 1/428
                                                          248/604
(Continued)

FOREIGN PATENT DOCUMENTS

CN 203614382 U 5/2014
DE 29 28 469 A1 1/1981
(Continued)

OTHER PUBLICATIONS

Office Action dated Sep. 29, 2021, issued in counterpart German Patent Application No. 10 2021 106 098.2. (9 pages).
(Continued)

*Primary Examiner* — Mark A Laurenzi
*Assistant Examiner* — Benjamin Doyle
(74) *Attorney, Agent, or Firm* — WHDA, LLP

(57) ABSTRACT

The invention relates to a holder for fastening at least one pump in a motor vehicle, comprising an elastic damping element with an inner ring and an outer ring, wherein the inner ring and the outer ring are connected to one another via at least one connecting element, wherein the inner ring is provided for receiving the pump and the outer ring is provided for receiving a holding element for mounting on the matching counterpart in the vehicle.

11 Claims, 3 Drawing Sheets

(58) Field of Classification Search
USPC .................................................. 417/363, 360
See application file for complete search history.

(56) References Cited

U.S. PATENT DOCUMENTS

| | | | | | |
|---|---|---|---|---|---|
| 3,065,941 | A | * | 11/1962 | Loftis | F16F 15/06 248/604 |
| 4,362,476 | A | * | 12/1982 | Kemmner | F02M 37/106 417/363 |
| 4,676,473 | A | * | 6/1987 | Giles | F16F 15/08 248/680 |
| 7,568,602 | B2 | * | 8/2009 | Turk | F16F 1/328 227/156 |
| 7,886,721 | B2 | | 2/2011 | Sanden | |
| 2002/0015647 | A1 | * | 2/2002 | Nakagaki | F16F 15/08 417/363 |
| 2005/0058556 | A1 | * | 3/2005 | Cremer | F02M 37/103 417/363 |
| 2008/0135561 | A1 | * | 6/2008 | Sanden | B60K 15/077 220/562 |
| 2013/0111721 | A1 | * | 5/2013 | Mahfoudh | F04D 29/605 269/305 |
| 2014/0299735 | A1 | * | 10/2014 | Hein | F16F 15/04 248/562 |
| 2017/0217380 | A1 | * | 8/2017 | Mahfoudh | H02K 5/24 |
| 2017/0343153 | A1 | * | 11/2017 | Yilmaz | F04D 13/14 |
| 2021/0388852 | A1 | * | 12/2021 | Findeisen | F04D 29/605 |
| 2024/0003363 | A1 | * | 1/2024 | Henn | F04D 29/60 |

FOREIGN PATENT DOCUMENTS

| | | |
|---|---|---|
| DE | 10 2005 000 730 A1 | 7/2006 |
| DE | 10 2007 005 698 A1 | 8/2007 |
| DE | 10 2006 050 818 A1 | 4/2008 |
| DE | 10 2009 029 591 A1 | 3/2011 |
| DE | 10 2014 224 978 A1 | 6/2016 |
| DE | 10 2016 209 204 A1 | 11/2017 |
| WO | 00/54392 A1 | 9/2000 |
| WO | 2011/032757 A1 | 3/2011 |
| WO | WO-2017001155 A1 * | 1/2017 |

OTHER PUBLICATIONS

International Search Report dated May 31, 2022, issued in counterpart International Application No. PCT/DE2022/200034. (2 pages).

* cited by examiner

HOLDER FOR FASTENING A PUMP

The invention relates to a holder for fastening at least one pump in a motor vehicle.

Holders for fastening pumps in the motor vehicle are already known. However, the known holders have the disadvantage that they lose stability, which in the worst case can lead to the pump slipping out of the holder. The production and assembly of the holders are usually also complex.

The object of the invention is to provide a holder for fastening at least one pump in a motor vehicle which ensures increased stability and simple assembly, and dampens noise transmissions and vibrations from the component.

According to the invention, the holder for fastening at least one pump in a motor vehicle has an elastic damping element with an inner ring and an outer ring, wherein the inner ring and the outer ring are connected to one another via at least one connecting element, wherein the inner ring is provided for receiving the pump and the outer ring is provided for receiving a holding element for mounting on the matching counterpart in the vehicle. Sound transmission and vibrations of the at least one pump are damped by the damping element on the holder. The holding element in the outer ring improves the stability of the holder. In addition, the at least one pump is prevented from slipping out of the holder.

In a further development of the invention, the holding element is introduced into the outer ring by means of an integral method. This enables simple and cost-effective protection of the holding element against corrosion and wear.

Preferably, the holding element is introduced into the outer ring by means of vulcanization or overmolding. This leads to an integral connection between the holding element and the outer ring. In addition, a force-fit and/or form-fitting connection is thereby produced between the holder and the at least one pump. Due to the vulcanization or overmolding of the holding element into the outer ring, a separate assembly step is omitted, since the holding element does not have to be additionally mounted into the outer ring.

It is advantageous that the holding element is at least partially enclosed by the outer ring over the entire circumference. As a result, the holding element is protected against corrosion or wear. The vulcanization or overmolding of the holding element over its entire circumference additionally protects the holding element from deformation. However, the holding element can also be enclosed completely and without gaps.

It is advantageous that the holding element is at least partially designed as a sheet metal ring. The sheet metal ring can be formed from a metal strip. Alternatively, the holding element can also be formed from another material, such as plastic, or from a combination of a plurality of materials.

In a further development of the invention, the holding element has fastening elements which are not completely enclosed by the outer ring. The fastening elements protrude from the outer ring in the radial direction. An axial or tangential projection of the fastening elements out of the outer ring is also conceivable. By means of the fastening elements, the holder can be mounted on a matching counterpart on the motor vehicle.

It is advantageous that a first fastening element is designed as a contact tongue and a second fastening element as a clamping tongue. By means of the contact tongue, the holder on the matching counterpart of the motor vehicle can be fastened by screws, pins, levers or an alternative fastening type familiar to the person skilled in the art. For this purpose, the contact tongue has, for example, a bore or recess for the fastening and is spaced apart from the outer ring in the axial direction. The clamping tongue engages in a corresponding recess on the motor vehicle and represents a clamping connection. Preferably, the clamping tongue runs at a distance from the outer ring in a defined radius in the axial direction and forms approximately a semicircle.

It is advantageous that the fastening elements interact with corresponding counter pieces of the vehicle, in particular by positive and/or non-positive connection. The fastening elements thereby enable a quick and simple mounting of the holder on the motor vehicle.

In a further development of the invention, the outer ring and/or the inner ring have recesses distributed over the circumference. Due to the recesses, the outer ring and/or inner ring have different radial stiffening, which additionally avoid deformation of the holder. In addition, weight is saved by the recesses on the outer ring and/or inner ring.

In a further development of the invention, connecting elements are arranged distributed over the circumference of the damping element.

It is advantageous that the connecting elements are preferably V-shaped as spokes or webs. In principle, the connecting elements can also have alternative shapes. The inner ring and the outer ring are connected to one another by the connecting elements. The V-shaped connecting elements prevent rotation of the outer ring and inner ring against one another during the assembly of the at least one pump on the counterpart of the motor vehicle. In addition, the force flow is optimized by the V-shaped connecting elements.

When assembling the at least one pump into the holder, the inner ring is expanded and applied to the pump by means of pressing. The expansion of the inner ring is not passed on to the outer ring by the connecting elements between the outer ring and the inner ring and the holding element in the outer ring is thus not deformed.

It is advantageous that an odd and/or even number of connecting elements is provided. The connecting elements also serve to dampen noise and vibrations. An odd number of connecting elements is preferred, since these reduce the absorption of the harmonic vibrations of the component/pump.

In a further development of the invention, a bevel and/or a bead are formed on the inner ring at least on one side. This bevel serves for easier introduction of the at least one pump into the holder. In addition, the bead prevents the at least one pump from slipping out of the holder.

In a further advantageous embodiment, at least one receptacle for a holding lug of a pump is formed on the inner ring. As a result, the pump can be additionally fastened during assembly and twisting is made more difficult.

It is advantageous that the inner ring is conical. As a result, the at least one pump can be accommodated in the holder in an accurate manner during assembly.

In a further development of the invention, the holder has a damping element with a plurality of inner rings and outer rings, which are designed according to the previous embodiments for receiving a plurality of pumps. A plurality of inner rings and outer rings can be formed In the damping element with holding element In order to accommodate several pumps. This has the advantage that not every individual pump has to be fastened to a counterpart in the motor vehicle with a holder. The counterpart in the motor vehicle thus requires only the corresponding clamping regions or bores to which the fastening elements (contact tongue and clamping tongue) are fastened. In addition, this holder saves installation space, is compact and ensures a simple assembly of several pumps at the same time.

The invention is not limited to the mentioned exemplary embodiments. Rather, all embodiment variants that are implemented within the scope of the expert activity and minor expert changes are included.

The exemplary embodiments of the invention are explained in more detail below based on the drawing. The following is shown:

Figure 1:
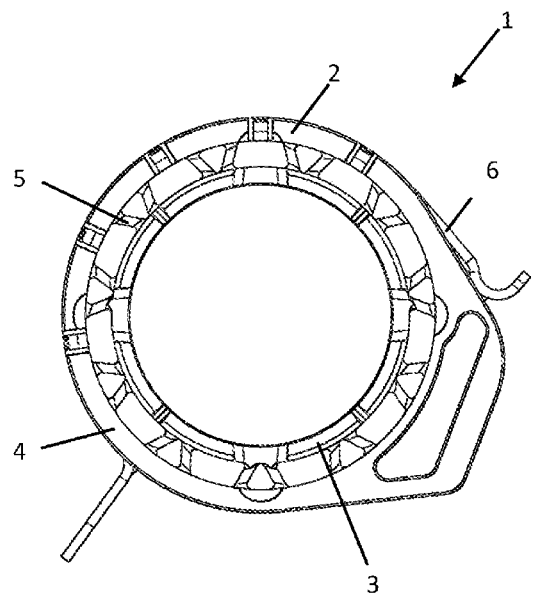
FIG. 1 is a spatial representation of the holder.

FIG. 1 shows a spatial representation of the holder 1 according to the invention for fastening at least one pump in a motor vehicle, comprising an elastic damping element 2 with an inner ring 3 and an outer ring 4. The inner ring 3 and the outer ring 4 are connected to one another via at least one connecting element 5. The inner ring 3 is provided for receiving the pump and the outer ring 4 for receiving a holding element 6 for mounting on the matching counterpart in the vehicle.

Figure 2:
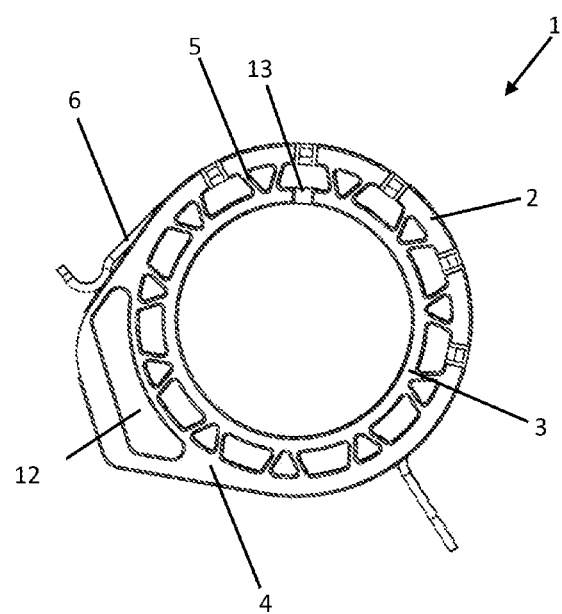
FIG. 2 shows the holder according to FIG. 1 in a different perspective.

FIG. 2 shows the holder 1 according to FIG. 1 in a different perspective. The damping element 2 has an inner ring 3 and an outer ring 4, which are connected to one another by connecting elements 5. A notch 12 in the damping element 2 serves to reduce the weight of the holder. A plurality of notches can also be provided. At least one receptacle 13 is provided on the inner ring 3, which corresponds to an (optional) holding lug on the pump. The pump can also be secured during assembly and twisting is made more difficult. A plurality of receptacles can also be provided.

Figure 3:
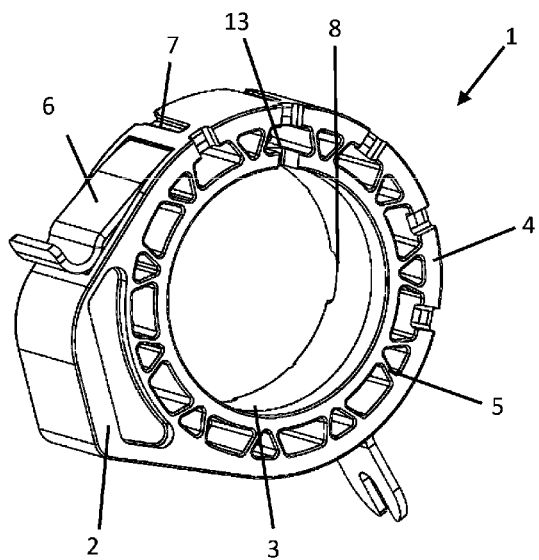
FIG. 3 is a spatial representation of the holder.

FIG. 3 shows the holder 1 comprising the damping element 2 with the inner ring 3 and the outer ring 4, which are connected to one another via connecting elements 5. The holding element 6 is vulcanized or overmolded in the outer ring 4. The holding element 6 can also be guided through the outer ring 4 as an insert or pressed into the outer ring or pressed onto the outer ring. The outer ring 4 and the inner ring 3 have recesses 7, 8.

Figure 4:
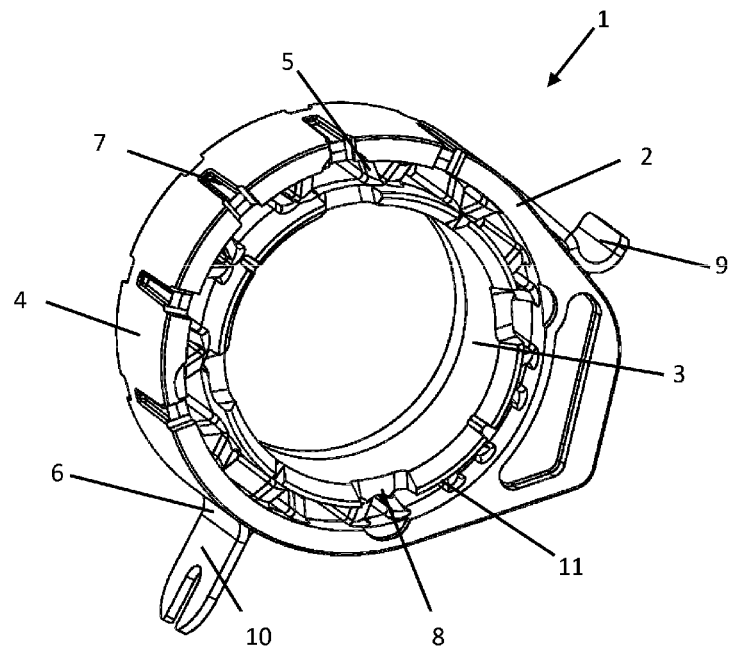
FIG. 4 shows the holder according to FIG. 3 in a different perspective.

FIG. 4 shows the holder 1 according to FIG. 3 in another perspective comprising the damping element 2 with the inner ring 3 and the outer ring 4, which are connected to one another via connecting elements 5. Recesses 7, 8 are formed In the outer ring 4 and the inner ring 3. From the outer ring 4, the fasteners 9, 10 protrude, which are designed as a contact tongue and clamping tongue. A bevel 11 is formed on the inner ring 3 in the radial direction. A bead can further be provided to prevent the pump from slipping out of the holder.

Figure 5:
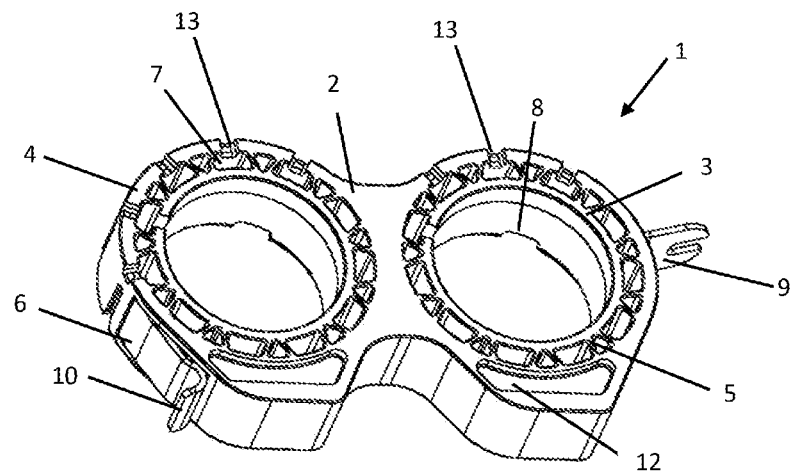
FIG. 5 shows the holder for receiving a plurality of pumps.

FIG. 5 shows the holder 1 according to the invention with a damping element 2 with a plurality of inner rings 3 and outer rings 4, which is designed to receive a plurality of pumps. The inner ring 3 and the outer rings 4 are connected to one another via connecting elements 5. Recesses 7, 8 are formed in the outer ring 4 and the inner ring 3. From the outer ring 4, the fasteners 9, 10 protrude, which are designed as a contact tongue and clamping tongue. A plurality of notches 12 is formed in damping element 2.

LIST OF REFERENCE SYMBOLS

1 Holder
2 Damping element
3 Inner ring
4 Outer ring
5 Connecting element
6 Holding element
7 Recesses outer ring
8 Recesses inner ring
9 First fastening element
10 Second fastening element
11 Bevel
12 Notch
13 Receptacle

The invention claimed is:

1. A holder for fastening at least one pump in a motor vehicle, comprising an elastic damping element with an inner ring and an outer ring, wherein the inner ring and the outer ring are connected to one another via at least one connecting element, wherein the inner ring is provided for receiving the pump, wherein a holding element for mounting on the matching counterpart in the vehicle is introduced into the outer ring by methods by which the holding element is formed together with the outer ring through vulcanization and is enclosed by the outer ring over an entire circumference of the holding element, wherein the holding element is designed as a metal strip and wherein the holding element has a plurality of fastening elements which are not completely surrounded by the outer ring and wherein a first fastening element of the plurality of fastening elements is designed as a contact tongue and a second fastening element of the plurality of fastening elements as a clamping tongue, wherein the plurality of fastening elements interact with corresponding counterparts of the vehicle by positive or non-positive locking, wherein the circumference of the holding element extends from the contact tongue to the clamping tongue, wherein the contact tongue comprises a bore or recess for the fastening and is spaced apart from the outer ring in an axial direction, and wherein the clamping tongue runs at a distance from the outer ring in a defined radius in the axial direction and forms approximately a semicircle.

2. The holder according to claim 1, wherein the holding element is introduced into the outer ring by methods by which the holding element is formed together with the outer ring through at least overmolding, or a similar process.

3. The holder according to claim 1, wherein the holding element is at least partially enclosed by the outer ring over the entire circumference.

4. The holder according to claim 1, wherein the outer ring and/or the inner ring has recesses distributed over the circumference.

5. The holder according to claim 1, wherein the at least one connecting element comprises a plurality of connecting elements that are distributed over the circumference of the damping element.

6. The holder according to claim 1, wherein the at least one connecting element comprises a plurality of connecting elements that are V-shaped as spokes or webs.

7. The holder according to claim 1, wherein an odd and/or even number of connecting elements is provided.

8. The holder according to claim 1, wherein a chamfer and/or a bead is formed on the inner ring at least on one side.

9. The holder according to claim 1, wherein at least one receptacle for a retaining lug of the pump is formed on the inner ring.

10. The holder according to claim 1, wherein the inner ring is conical.

11. The holder according to claim 1, wherein the holder comprises a plurality of damping elements having a plurality of inner rings and outer rings which are designed according to claim 1 for receiving a plurality of pumps.

* * * * *